April 2, 1974
B. W. LOVEKIN
ELECTROLYTIC CELL FOR SHARPENING
THE EDGE OF A RAZOR BLADE
Original Filed March 21, 1966
Re. 27,961
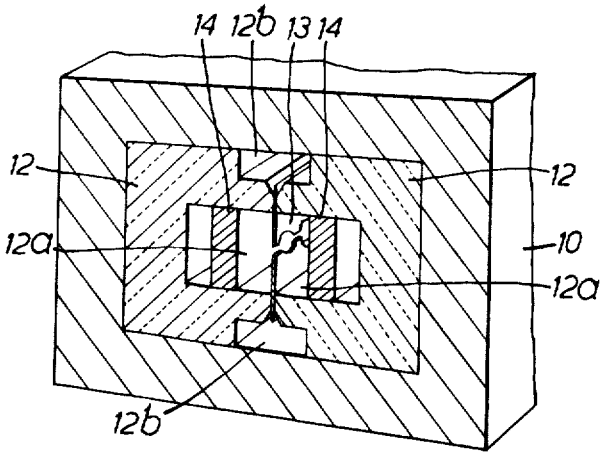
INVENTOR
BARRY W. LOVEKIN
BY
Wolfe, Hubbard, Voit & Osann
ATTORNEYS United States Patent Office Re. 27,961
Reissued Apr. 2, 1974

27,961

ELECTROLYTIC CELL FOR SHARPENING THE EDGE OF A RAZOR BLADE

Barry William Lovekin, High Wycombe, England, assignor to Wilkinson Sword Limited, London, England Original No. 3,470,081, dated Sept. 30, 1969, Ser. No. 536,054, Mar. 21, 1966. Application for reissue Aug. 25, 1970, Ser. No. 66,909

Claims priority, application Great Britain, Aug. 2, 1963, 30,658/63; May 14, 1964, 20,032/64; Mar. 30, 1965, 13,324/65

Int. Cl. C23b *5/58*

U.S. Cl. 204—206 6 Claims

Matter enclosed in heavy brackets [ ] appears in the original patent but forms no part of this reissue specification; matter printed in italics indicates the additions made by reissue.

ABSTRACT OF THE DISCLOSURE

An electrolytic cell for the electroforming or electrofinishing of the cutting edges of razor blades is so constructed that there is no physical contact between the electrodes of the cell and the razor blades during the process. This is achieved by providing a first chamber for containing electrolyte with which the anode is in contact and a second chamber for containing electrolyte, isolated from the electrolyte in the first chamber, with the cathode in contact with the electrolyte in the second chamber. A razor blade is supported with the edge which is to be electroformed or electrofinished in the electrolyte in the second chamber whilst a portion of the blade behind the edge is in contact with the electrolyte in the first chamber. In this way current flows from the anode through the electrolyte in the first chamber to the portion of the blade behind the cutting edge through the blade to the edge which is to be electroformed or electrofinished and thence through the electrolyte in the second chamber to the cathode.

*Priority of the present invention is based on my Provisional application No. 13,324/65, filed in Great Britain on Mar. 30, 1965, a certified copy of which is filed with my United States application Ser. No. 536,054, filed Mar. 21, 1966 and now issued as original Letters Patent No. 3,470,081 of which this is a reissue. The Provisional application No. 13,324/65 describes the invention thereof with reference to the complete specification, filed July 28, 1964 in Great Britain, of cognate Provisional applications Nos. 30,658/63 and 20,032/64 filed in Great Britain by the assignee hereof, a certified copy of said complete specification is filed with this application and a certified copy of said Provisional application No. 20,032/64 was filed on June 21, 1965 in the file of my United States application Ser. No. 450,718, filed Apr. 26, 1965 and now issued as U.S. Pat. No. 3,399,130 on Aug. 27, 1968.*

This invention relates to electrolytic cells for the production of cutting edges and, more particularly, to cells for the production of the cutting edges of razor blades.

The cells may be used for the finishing, only, of cutting edges after initial formation by other methods, such as abrasive methods, and such processing will be referred to hereafter as "electro-finishing." On the other hand, the cells may be used for production of a cutting edge, without prior mechanical shaping, in which case such processing will be referred to hereafter as "electroforming."

According to the present invention there is provided an electrolytic cell for electroforming or electrofinishing the cutting edge of a razor blade wherein there is no physical contact between the blade and the anode of the cell.

The invention also provides an electrolytic cell for electroforming or electrofinishing the cutting edge of a razor blade comprising means for guiding razor blade strip through the cell and at least one anode so located that there is no physical contact with the blade strip when it is passing through said guiding means.

There is further provided by the invention an electrolytic cell for electroforming or electrofinishing the cutting edge of a razor blade comprising a first chamber adapted to contain electrolyte the anode being in contact with the electrolyte, a second chamber adapted to contain electrolyte, the cathode being in contact with the electrolyte in said second chamber, and means for supporting the razor blade with one edge in contact with the electrolyte in said second chamber and an intermediate portion of the blade in contact with the electrolyte in said first chamber.

One construction of cell in accordance with the invention will now be described with reference to the accompanying drawing which is a perspective sectional view through the cell.

This construction of cell and its method of operation has been fully described and illustrated in co-pending patent application Ser. No. 522,668 assigned to the same assignee as is the present application. The aforesaid application is directed to those features of the structure of the cell which facilitate electroforming or electrofinishing of a desired shape of cutting edge whereas the present application is primarily directed to those features of the structure of the cell which eliminate the necessity for physical contact between the anode and the blade.

Referring now to the drawing, it will be seen that the construction is as described and illustrated in the aforesaid application. Thus, the cell comprises a metal housing 10 which constitutes the cathode. Within the cathode housing 10 two screening masks 12, 12 of ceramic material are mounted and the adjacent faces of these are separated by a sufficient distance to allow the passage of metal strip 13, in the form of razor blade blanks joined end-to-end and with a central slot already punched. The strip 13 makes a sliding fit with the faces of masks 12, 12. The masks 12, 12 each have a central aperture in which an elongated anode 14 is mounted to form an electrolyte containing anode chamber 12a, 12a between the blade strip 13 and the respective anode 14, 14. The masks 12, 12 are also shaped to provide cathode chambers 12b, 12b.

For other details of the cell construction and the methods of electroforming or electrofinishing reference should be made to the specification and drawings filed with the aforesaid application.

The current path is from each anode 14 through the electrolyte in its respective anode chamber 12a to the central portion of the blade strip 13, through the blade strip to the exposed surface at each edge and thence through the electrolyte in the respective cathode chamber 12b to the cathode 10.

The construction described has the great advantage that it is not necessary for there to be physical contact between the anode and the blade strip. Such physical contact suffers from the disadvantage that there is a liability for arcing to occur between the anode (or contact strip at anode potential) and the moving blade strip and that inevitably wear of the anode (or contact strip) occurs.

Any tendency for metal to be plated onto the central blade strip can be prevented or reduced by selecting an anode material which does not dissolve in the required manner for plating out, examples being rhodium-plated anodes such as rhodium-plated copper, lead anodes and graphite anodes. Alternatively, the anodes may consist of a coating of a precious metal on a base metal of anodically polarizable material. Whilst for this purpose we prefer to use a platinum coated or clad titanium base it is also possible to employ plating of other precious metals, for example rhodium, gold or irridium. These metals are good conductors and have the advantage that they do not dissolve in the electrolyte. It is desirable to use a base of anodically polarizable material so that if there are any pin holes in the plating the base will not be dissolved. Tungsten is another material which can be used for the base but it is more difficult to machine than titanium and more expensive.

It will be appreciated that only one anode member is necessary but that greater efficiency can be obtained by the use of two. Moreover, the anodes need not be planar but can have any appropriate shape for maximum current efficiency. Thus, as an alternative to having anodes in the form of strips the anodes may be in the form of rods, the circular cross-section having the advantage of maximum surface area for a given cross-section.

I claim:

1. In an electrolytic cell for at least finishing the cutting edge of a razor blade, an elongated cathode, at least one elongated anode, and guide means for supporting a razor blade having at least one unfinished cutting edge in predetermined position relative to said cathode and said anode, said guide means and said cathode defining a first elongated space for containing electrolyte in contact with said cathode, said unfinished cutting edge projecting into said electrolyte with the cathode lying opposite said unfinished cutting edge throughout its length, said guide means and said anode defining a second elongated space for containing further electrolyte in isolation from the electrolyte in said first space and in contact with said anode and with a portion of the blade lying behind said unfinished edge, said anode lying opposite said portion of the blade throughout its length, whereby in operation current flows from the anode through said further electrolyte to said portion of the blade throughout the length of said portion, thence to said unfinished cutting edge and from the entire length of said unfinished cutting edge through the electrolyte in said first space to said cathode.

2. An electrolytic cell according to claim 1, wherein said cathode constitutes the cell housing.

3. An electrolytic cell according to claim 1, comprising a second elongated anode, said guide means, and said second anode defining a third space for containing still further electrolyte in contact with said second anode and with said portion of the blade lying behind said unfinished edge.

4. An electrolytic cell according to claim 3, wherein said razor blade has a second unfinished edge and wherein said guide means and said cathode define a fourth space for containing addition electrolyte in contact with said cathode, said second unfinished edge projecting into said additional electrolyte.

5. An electrolytic cell according to claim 1, wherein that portion of the surface of said anode which is in contact with said further electrolyte in said second space is substantially planar.

6. An electrolytic cell according to claim 3, wherein that portion of the surface of said second anode which is in contact with said still further electrolyte in said third space is substantially planar.

References Cited

The following references, cited by the Examiner, are of record in the patented file of this patent or the original patent.

UNITED STATES PATENTS

| | | | |
|---|---|---|---|
| 3,055,811 | 9/1962 | Ruff | 204—47 |
| 2,974,097 | 3/1961 | Ramirez et al. | 204—206 |
| 2,764,542 | 9/1956 | Pullen | 204—268 |

JOHN H. MACK, Primary Examiner

R. L. ANDREWS, Assistant Examiner